(12) United States Patent
Thomas et al.

(10) Patent No.: US 8,117,152 B2
(45) Date of Patent: Feb. 14, 2012

(54) SYSTEM AND METHOD FOR THE SYNCHRONIZATION OF A FILE IN A CACHE

(75) Inventors: David Thomas, Austin, TX (US); Scott Wells, Austin, TX (US)

(73) Assignee: Open Text S.A., Grand Duchy of Luxembourg (LU)

( * ) Notice: Subject to any disclaimer, the term of this patent is extended or adjusted under 35 U.S.C. 154(b) by 281 days.

(21) Appl. No.: 12/545,423

(22) Filed: Aug. 21, 2009

(65) Prior Publication Data

US 2010/0049757 A1 Feb. 25, 2010

Related U.S. Application Data

(60) Continuation of application No. 11/328,526, filed on Jan. 10, 2006, now Pat. No. 7,590,665, which is a division of application No. 10/033,242, filed on Dec. 28, 2001, now Pat. No. 7,062,515.

(51) Int. Cl.
 *G06F 17/30* (2006.01)
(52) U.S. Cl. .......................... 707/609; 709/203
(58) Field of Classification Search .................. 707/609; 709/203
 See application file for complete search history.

(56) References Cited

U.S. PATENT DOCUMENTS

| | | | |
|---|---|---|---|
| 5,202,982 A | 4/1993 | Gramlich et al. |
| 5,293,619 A | 3/1994 | Dean |
| 5,473,772 A | 12/1995 | Halliwell et al. |
| 5,504,879 A | 4/1996 | Eisenberg et al. |
| 5,740,430 A | 4/1998 | Rosenberg et al. |
| 5,829,022 A | 10/1998 | Watanabe et al. |
| 6,026,413 A | 2/2000 | Challenger et al. |
| 6,088,702 A | 7/2000 | Plantz |
| 6,105,037 A | 8/2000 | Kishi |
| 6,151,624 A | 11/2000 | Teare et al. |
| 6,185,608 B1 | 2/2001 | Hon et al. |
| 6,198,824 B1 | 3/2001 | Shambroom |

(Continued)

OTHER PUBLICATIONS

Dasgupta, Partha, "Resource Location in Very Large Networks," IEEE, pp. 156-163, May 1994.

(Continued)

*Primary Examiner* — Cheryl Lewis
(74) *Attorney, Agent, or Firm* — Sprinkle IP Law Group

(57) ABSTRACT

The present invention provides a system and method of synchronizing a cache that substantially eliminates or reduces disadvantages associated with previously developed systems and methods of synchronizing caches. More particularly, embodiments of the present invention provide a system and method for bi-directional synchronization of a cache. One embodiment of the system of this invention includes a software program stored on a computer readable medium. The software program can be executed by a computer processor to run in user space and perform steps comprising: receiving a database asset from a database; storing the database asset as a cached file in a cache; determining if the cached file has been modified; and if the cached file has been modified, communicate the cached file directly to the database. In one embodiment of the present invention, the software program can determine if the cached file has been modified through automatic notification from a file management system. Alternatively, the software program can poll a cached file to determine if the cached file has changed. In another embodiment of the present invention, the software program can be further executable to perform the step of prompting an operating system to open the cached file in an application associated with the cached file's file type. In yet another embodiment of the present invention, the software program can be further executable to receive notifications from a database of when contention for a database asset occurs. Thus, bi-directional synchronization can occur.

20 Claims, 2 Drawing Sheets

U.S. PATENT DOCUMENTS

| | | |
|---|---|---|
| 6,219,675 B1 | 4/2001 | Pal et al. |
| 6,434,543 B1 | 8/2002 | Goldberg |
| 6,687,793 B1 | 2/2004 | Thomas et al. |
| 6,697,844 B1 | 2/2004 | Chan et al. |
| 6,701,345 B1 | 3/2004 | Carley |
| 6,701,428 B1 | 3/2004 | Harvey, III et al. |
| 6,754,621 B1 | 6/2004 | Cunningham et al. |
| 6,850,941 B1 | 2/2005 | White et al. |
| 6,952,741 B1 | 10/2005 | Bartlett et al. |
| 7,062,515 B1 | 6/2006 | Thomas et al. |
| 7,590,665 B2 | 9/2009 | Thomas et al. |
| 2001/0032254 A1 | 10/2001 | Hawkins |
| 2002/0107835 A1 | 8/2002 | Coram et al. |
| 2003/0101223 A1 | 5/2003 | Pace |
| 2004/0205452 A1 | 10/2004 | Fitzsimmons et al. |
| 2005/0278458 A1 | 12/2005 | Berger et al. |

OTHER PUBLICATIONS

Vetter. Ronald, J. "Mosaic and the World-Wide Web," IEEE, pp. 49-57, Oct. 1994.

Obraczka et al., "Internet Resource Discovery Services," IEEE, p. 8-22, Sep. 1993.

Sharma et al., "Hypertext Based Distributed Object Management for Information Location and Retrieval," IEEE, pp. 102-107, 1993.

Encryption and Decryption at wysiwyg://101/http://msdn.microsof....brary/wcedoc/wcesecur/crypto_1.htm, pp. 1-2, printed May 23, 2001.

Turley, "Design Specification for Packaged Application Support in Assassin," Vignette Corporation, pp. 2-6, 1999.

Turley, Functional Specification for Packaged Application Support in Assassin, Vignette Corporation, pp. 2-6, 1999.

Office Action mailed in U.S. Appl. No. 10/333,242, mailed Jul. 8, 2004, 30 pgs.

Office Action mailed in U.S. Appl. No. 10/333,242, mailed Mar. 4, 2005, 31 pgs.

Office Action mailed in U.S. Appl. No. 10/333,242, mailed Aug. 24, 2005, 11 pgs.

Office Action mailed in U.S. Appl. No. 11/328,526, mailed Jun. 6, 2008, 15 pgs.

SYSTEM AND METHOD FOR THE SYNCHRONIZATION OF A FILE IN A CACHE

RELATED APPLICATIONS

This application is a continuation of and claims priority under 35 U.S.C. §120 to U.S. patent application Ser. No. 11/328,526, U.S. Pat. No. 7,590,665, filed Jan. 10, 2006, entitled "SYSTEM AND METHOD FOR THE SYNCHRONIZATION OF A FILE IN A CACHE", by David Thomas et al., which in claims priority under 35 U.S.C. §120 to U.S. patent application Ser. No. 10/033,242, U.S. Pat. No. 7,062, 515, filed Dec. 28, 2001, entitled "SYSTEM AND METHOD FOR THE SYNCHRONIZATION OF A FILE IN A CACHE" by David Thomas et al., which is hereby fully incorporated by reference herein.

TECHNICAL FIELD OF THE INVENTION

This invention relates generally to cache management and more particularly to a system and method of synchronizing a cached file with a database.

BACKGROUND OF THE INVENTION

Centralized databases are becoming increasingly popular for storing electronic files or "database assets." Most databases are operated under a client/server computer network model. In a client/server network, a client computer requests information (e.g., makes a request for files or database assets, etc.) from a server computer. In response to the request, the server computer searches the database for the requested information, retrieves the information, and communicates the information to the requesting client computer.

Having a general repository of information such as a database is advantageous because it allows multiple users to access the same file from various client computers, thereby allowing, for example, employees from disparate departments to work together on the same project, thus promoting efficiency and teamwork. Furthermore, because employees can access the database from remote computers via a network (e.g., LAN, Internet, etc.), the employee can access and work on files from home or while "on the road." Thus, databases help support employee mobility and even the most mobile employees can work with database assets so long as the employee can establish a network connection to a database server (e.g., the computer responsible for handling database requests).

Additionally, databases free organizations from relying on individual users to store files on local machines. Using a centralized database to store files can decrease the likelihood that a file will be lost or corrupted if an employee misplaces or damages his/her computer. Yet another advantage provided by centralized databases is that an organization can control user access to particular database assets. Through authentication and authorization (validation) processes, such as requiring user names and/or passwords, an organization can govern which employees can work with particular files. This can help in controlling of work product and in ensuring quality control.

Because database assets are typically transported over a relatively slow network connection, a cache at a user's computer can be used to increase the speed with which files can be accessed and modified. A cache typically stores a local copy of a database asset on the user's computer. Thus a user can access and modify a local copy of a file, which is generally much faster than accessing a file directly over a network. When a user makes a change to the local or "cached" file copy, the change can, as will be described below, be synchronized with the database from which the file was originally retrieved.

Despite the many advantages provided by databases, databases also present many challenges to organizations. Typically, an organization's database(s) include a myriad of different database asset types. For example, a corporation's database might include Microsoft™ Word™ files, Microsoft™ Excel™ files, WordPerfect™ files, text files, graphics files (e.g., .jpg, .tif, or .gif), html files, AutoCAD™ files, etc. In addition to storing multiple types of database assets, there may also be a number of different users trying to access the same files.

Adding to the complexity of database management, various users of database assets may prefer to use different tools (e.g., they will have a "tool of choice") to modify different types of database assets. Thus, for example, one user may prefer to use Microsoft™ Word™ to edit word processing documents while another user may prefer a different text editor. Therefore, in managing a network incorporating a database, an organization must be able to reconcile the multifarious subjective user preferences.

Several systems have been developed in an attempt to meet the challenges presented by database management. One current system requires that users employ custom-designed tools in order to edit the assets in a database. While the custom-designed tools typically reduce latency by automatically saving changes or modifications to the database, these systems are unattractive because they do not allow a user to seamlessly employ his/her tool of choice. Instead, the user must utilize a tool provided by the database vendor or an external editor that is typically cumbersome to use. Because he/she may not be familiar or efficient with the tool, the user may require extra training and, consequently, this can result in extra expense to the employer or other organization.

A second option that is currently available allows a user to utilize standard software tools (e.g., Microsoft™ Word™) to access and modify database assets, but requires a second program (a "synchronization program") on the client machine to synchronize any modifications that a user makes on his/her client machine with the database. These systems, also have several shortcomings. Primarily, synchronization programs are typically designed to run with only one software tool (e.g., they act as a plug-in to an existing software application) or, if designed to run with multiple programs, they require significant amounts of additional coding. Thus, a user will be able to use only the tools for which the organization has a synchronization program in place. Therefore, a user's choice in software is severely limited by the presence or absence of a synchronization program. Furthermore, these prior art systems typically require that the user take extra steps in saving data to the database. When a user saves a file on his/her local (e.g., client) machine, he/she typically must also save the file in the synchronization program in order to have the file saved to the database. While it may only take an additional few seconds to save a file to the database using the synchronization program (though it can take significantly longer, particularly to save large files to a remote database), over the course of many saves this can lead to significant losses in time and productivity. These systems are also deficient because they can lead to significant latency problems. If a user forgets to perform the extra step of saving a file to the database using the synchronization program, any modifications that the user saved using a local program or tool will only be saved locally and will not be reflected on the database until the user synchronizes the local file with the database. Thus, if a user forgets to save a file to the database using the synchronization program, the database will not contain the latest version of a file for a potentially long period of time. Consequently, if another user access the file from the database before synchronization occurs, he or she will not receive up-to-date information.

Yet another existing system for accessing and modifying database assets that has been developed is an operating system-level implementation that creates a file system on a local machine (e.g., a user's computer or client computer), that allows the user to view database assets as if the assets were locally situated. In this system, the user sees the database reflected as an additional virtual local storage device (e.g., an "E" drive). Database assets are depicted as files on the file system. When a user selects the database asset that he/she wants to edit (e.g., by double clicking on the asset), the database asset can be retrieved from the database and can be opened locally with whichever program is associated with that particular type of asset (e.g., Adobe® PhotoShop could open .jpg files). This system presents shortcomings, however, because it requires additional programming at the operating system "driver" level. Any defect or error in the program while the program is running can cause the local user's machine to cease functioning or "crash" until the operating system is reinitialized (e.g., until the client computer is rebooted), significantly reducing user productivity, and leading to loss of data.

SUMMARY OF THE INVENTION

The present invention provides a system and method of synchronizing a cache that substantially eliminates or reduces disadvantages associated with previously developed systems and methods of synchronizing caches. More particularly, embodiments of the present invention provide a system and method for bi-directional synchronization of a cache. An embodiment of the system of this invention includes a software program stored on a computer readable medium. The software programming can be executable by a computer processor to run in user space and perform steps comprising: receiving a database asset from a database; storing the database asset as a cached file in a cache; determining if the cached file has been modified; and, if the cached file has been modified, communicating the cached file to the database. In one embodiment of the present invention, the software program can determine if the cached file has been modified through automatic notification from a file management system. Alternatively, the software program can poll a cached file to determine if the cached file has changed. In another embodiment of the present invention, the software program can be further executable to perform the step of prompting an operating system to open the cached file in an application associated with the cached file's file type. In another embodiment of the present invention, the software program can be further executable to receive notifications from a database of when contention for a database asset occurs. Thus, bi-directional synchronization can occur.

Embodiments of the present invention provide a technical advantage because they do not require a user to manually save changes in a separate synchronization program, thereby saving substantial time and reducing latency.

Another technical advantage of the embodiments of the method and system of the present invention is the ability to synchronize cached files corresponding to a multitude of file types. Because various embodiments of the present invention can synchronize cached files, regardless of the file type, a user can employ his or her preferred tools of choice and he or she will not have to rely on unfamiliar, custom designed applications.

Yet another technical advantage of embodiments of the present invention is the capability to seamlessly synchronize a cache with a database. Because embodiments of the present invention can automatically determine if a cached file has been modified and can communicate the cached file to the database, latency is substantially reduced.

Embodiments of the present invention provide yet another technical advantage by being compatible with a variety of database and network architectures.

Still another technical advantage provided by embodiments of the present invention is the ability to reestablish database connections, thus increasing the likelihood that synchronization will occur.

Embodiments of the present invention provide yet another technical advantage by having the capability to receive notifications from the database when contention for a database asset occurs. Because a user can be made aware of when another user attempts to access the same database asset, issues of contention can be resolved more efficiently.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of the various drawings.

The embodiments of the method and system of the present invention provide the capability to seamlessly and transparently access database files locally and synchronize cached files with a database. Embodiments of the present invention provide the ability to save a database asset as a local cached file, determine if the cached filed has been accessed or modified, and if the cached file has been accessed or modified, synchronize the cached file and the associated database (e.g., the database from which the database asset was received). Additionally, the embodiments of the present invention can also provide the ability to open, view, and/or modify database assets via a user's preferred application or software tool.

Figure 1:
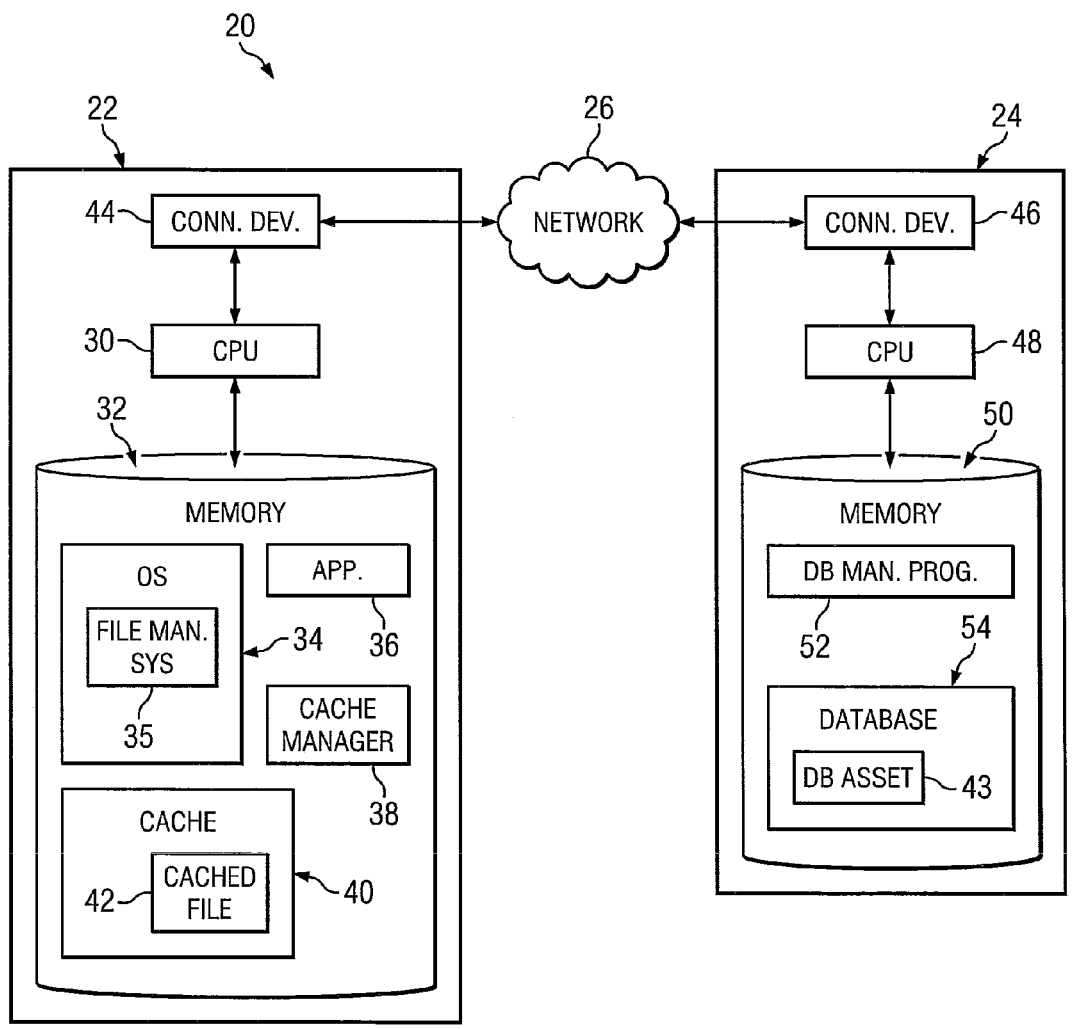
FIG. 1 illustrates a network that can include a client computer utilizing a cache manager according to an embodiment the present invention.

FIG. 1 illustrates a system 20 that can include a client computer 22 utilizing a cache manager 38 for managing a cache 40 according to one embodiment of the present invention. System 20 can include at least one client computer 22 and at least one server computer 24 ("Server 24"). Client computer 22 can connect to server 24 via a network 26. Network 26 can comprise any global computer network (e.g., the Internet), a wireless network, a local area network, or any other network capable of transporting data between a client computer and a server. Client computer 22 can be a personal computer, a workstation, a wireless device, a laptop computer, or any other computer device operable to access data from a database. Client computer 22 can include a central processing unit (CPU) 30 connected to a computer-readable memory 32. Memory 32 can comprise any combination of RAM, ROM, magnetic storage device, such as a hard drive, and/or other computer readable memory known in the art. Furthermore, while in FIG. 1 memory 32 is shown to be connected locally to CPU 30 at client computer 22, memory 32 can be distributed between several devices.

Memory 32 can store a number of computer programs, including an operating system 34, various applications 36 (that can comprise software tools) that can include word processing tools or other software tools known to those in the art, and a cache manager 38 residing in user-space. The concept of user-space is well-known to those of ordinary skill in the art. Operating system 34 can further include a file management system 35 to organize and keep track of files in memory 32. Memory 32 can also include a cache 40 which can contain cached versions of database assets, such as cached file 42. As will be discussed in greater detail below, cached file 42 can be a cached version, either modified or unmodified, of database asset 43. Client computer 22 can establish network communication through a network connection device 44. Network connection device 44 can be any network communication device that is known to those in the art.

Server 24 can include standard server computer components, including a server network connection device 46, a CPU 48, and a memory (primary and/or secondary) 50. Network connection device 46, CPU 48, and memory 50 can be equivalent components to network connection device 44, CPU 30, and memory 32 of client computer 22. Memory 50 can store database management program 52, which can be executable to carry out standard database functions, including receiving requests for data, retrieving the data, and returning the data to the requesting computer. Memory 50 can also include a database 54, which can include various database assets, such as database asset 43. The database assets can include a variety of different file types, including, but not limited to, text files, spreadsheet files, graphics files, html files, etc.

It should be noted that the system architecture illustrated in FIG. 1 is by way of explanation only and is designed to give context to the embodiments of the present invention. However, various embodiments of cache manager 38 can be implemented with different architectures of client computer 22 and/or server computer 24.

In operation, a user wishing to access database assets (e.g., database asset 43) can establish a connection through a standard network application, as is known to those in the art, with a server (e.g., server 24) associated with the database (e.g., database 54) on which the particular database asset (e.g., database asset 43) is stored. Cache manager 38 can be executable by CPU 30 to establish a connection with server 24 in any manner known in the art of establishing database connections through network connection device 44. As is understood by those with ordinary skill in the art, access to a database typically requires authentication with the database. Therefore, the user, when initially attempting to access server 24 (and database 54 associated therewith) may be required to enter login and authentication information. As will be discussed in greater detail below, in one embodiment of the present invention, cache manager 38 can store the login and authentication information so that if the connection to server 24 is subsequently dropped or lost, cache manager 38 can re-establish the connection without requiring the user to re-enter his/her login and/or authentication information.

Once the user has established a connection to server 24, cache manager 38 can determine the contents of database 54 and can enumerate the contents for display by a program in, for example, a graphical user interface. In one embodiment of the present invention, cache manager 38 can interface with file management system 35 for display of the database assets in a pre-existing interface. In a hierarchical file management system 35, for example, file management system 35 will use directories to organize files into a tree structure. Thus, in the case of a hierarchical file management system 35, cache manager 38 can interface with the hierarchical file management system 35 of operating system 34 to display database 54 as an additional tree node in the directory display and to organize database assets into the tree structure under the database directory. In the well-known Microsoft™ Windows operating system, database 54 could appear as an additional drive in a directory tree of the Windows Explorer display, and each database asset could appear as a file under the database directory. Alternatively, rather than interfacing with file management system 35, cache manager 38 can provide an independent and/or custom graphical user interface for organizing representations of database assets.

The user can select a database asset in which he/she is interested from the graphical user interface used by cache manager 38 (e.g., either the independent graphical user interface or the graphical user interface integrated with file management system 35). When the user selects a database asset (e.g., database asset 43) by, for example, double clicking on the database asset in the Windows™ Explorer display, cache manager 38 can determine if the connection to server 24 is still established. If the connection has been lost, cache manager 38 can establish a connection to server 24. If the connection is still established, (or once the connection is re-established), cache manager 38 can request the selected database asset (e.g., database asset 43). Database management program 52 will receive the request and search database 54 for database asset 43, retrieve database asset 43, and communicate a copy of database asset 43 to client computer 22 while typically maintaining a copy of database asset 43 on database 54. Cache manager 38 can receive database asset 43 and store database asset 43 as cached file 42 on memory 32. In addition, cache manager 38 can associate cached file 42 with a particular connection (e.g., with a particular database) so that if the user is accessing multiple databases, cache manager 38 can keep track of the database from which a cached file was retrieved. Cache manager 38 can also associate cached file 42 with a unique location on memory 32. In other words, cache manager 38 can store cached file 42 in a unique location in the file system of file management system 35.

Assume, for example, that database asset 43 is the file "myfile.jpg". When the user requests myfile.jpg, cache manager 38 can request the file from server 24. Database management program 52 can search database 54 for myfile.jpg, retrieve myfile.jpg, and send a copy of myfile.jpg to client computer 22 while retaining a copy on database 54. Cache manager 38 can receive myfile.jpg and associate myfile.jpg with database 54. Cache manager 38 can also save myfile.jpg as cached file 42 in cache 40 of memory 32 and associate myfile.jpg with a unique location in memory 32. As an example, cache manager 38 could store myfile.jpg on a hard disk drive (e.g., in memory 32) as "C:\cache\db54\myfile.jpg."

Operating system 34 can then open cached file 42 with whichever application 36 is associated with the file type for cached file 42. For example, if cached file 42 was myfile.jpg and operating system 34 normally opened .jpg files with Adobe™ Photoshop ("PhotoShop") (e.g., assume PhotoShop was associated with the .jpg file format), operating system 34 would open myfile.jpg with PhotoShop. The user is then free to view or modify myfile.jpg (e.g., cached file 42) in Photo-Shop (e.g., application 36). As files can be opened with the application or software programs that are associated with the particular file type, a user can utilize his/her preferred tool of choice to work on a file just as if (s)he were working from a file directly from file management system 35, providing a significant advantage over prior art systems.

After viewing and/or modifying myfile.jpg, the user can again save the file. When the user saves cached file 42 (e.g., when the user saves myfile.jpg in PhotoShop), cached file 42 can be saved in cache 40 of memory 32 at the location previously associated with cached file 42 by cache manager 38. In other words, application 36 will save cached file 42 back to the location from which application 36 opened cached file 42. In the case of myfile.jpg, this could entail saving myfile.jpg back to "C:\cache\db54\myfile.jpg."

In one embodiment of the present invention, cache manager 38 can interface with file management system 35 of operating system 34 to receive notification of when a particular file (e.g., cached file 42) has been saved by the user. For example, when a user saves a change to myfile.jpg, file management system 35 can notify cache manager 38 that cached file 42 has been saved. Thus, if file management system 35 supports automatic notification, cache manager 38 can exploit an inherent feature of file management system 35 to determine when cached file 42 is saved. It should be noted, however, that while the file management system 35 of the Microsoft™ Windows operating system allows for notification of when a file has changed, not all operating systems do so. If file management system 35 does not support automatic notification of when files are saved, cache manager 38 can poll cached file 42 to determine if cached file 42 has been modified. One method of polling files is disclosed in U.S. patent application Ser. No. 10/034,712, entitled "Method and System for Optimizing Resources for Cache Management", filed on Dec. 18, 2001, to inventors David Thomas and Scott Wells (the "Management Application"), which is hereby fully incorporated by reference.

Upon determining that cached file 42 has been saved, cache manager 38 can determine with which connection (e.g., with which database) cached file 42 is associated. In the continuing example of myfile.jpg, since myfile.jpg was received from database 54, myfile.jpg is associated with database 54, as described earlier. If the connection with which cached file 42 is associated has been dropped or lost, cache manager 38 can, in one embodiment of the present invention, re-establish the connection. This can be done by using the previously stored login and authentication information or by prompting the user to re-enter the login and/or authentication information. If the connection was not dropped or when the connection is re-established, cache manager 38 can communicate a copy of cached file 42 directly (e.g., without the use of an intermediate synchronization program) to server 24. Because cache manager 38 can re-establish lost or dropped connections, the user can still save files back to database 54 following a dropped connection.

If, after several attempts, cache manager 38 cannot re-establish the connection, cache manager 38 can notify the user that the connection has been lost and give the user the opportunity to backup cached file 42. Additionally cache manager 38 can delete cached file 42 so that cache 40 does not contain cached files that cannot be synchronized with a database because the connection associated with cached file 42 has been dropped.

It should be noted that even after cache manager 38 has communicated cached file 42 to server 24, a copy of cached file 42 can remain on memory 32 of client computer 22 so that the user can continue to work on cached file 42. Whenever cache manager 38 determines that cached file 42 has again been saved or closed in application 36, either through notification from file management system 35 or through polling, cache manager 38 can again communicate cached file 42 to server 24. Database management software 52 can then save cached file 42 as database asset 43, thus synchronizing database 54 with cached filed 42.

As can be understood from the foregoing discussion, the present invention can provide substantial advantages over previously developed systems for managing database assets. Because cache manager 38 can run in the background, a user's access to and modification of database assets can occur essentially transparently. Furthermore, because embodiments of cache manager 38 can interface with file management system 35 to receive notifications of when changes occur to cached file 42, cache manager 38 can quickly communicate the saved changes or modifications to database 54, thus reducing the latency between when cached file 42 is modified and when corresponding database asset 43 is updated. Also, because cache manager 38 can determine when cached file 42 has been saved, the user does not have to save cached file 42 in a separate synchronization program. Furthermore, as cache manager 38 can reside in user-space, cache manager 38 is much less likely to de-stabilize client computer 22, as would an operating system level program. Also, cache manager 38 can be transparent to the tools or applications used to access modify cached files.

FIG. 1 illustrates a system in which there is one client computer 22 and one server 24. However, it should be noted that there may be many client computers 22 and many servers 24. Potentially, a single user could access multiple databases and several users could access the same database. Because many users may be attempting to access the same database, contention for the same database asset can occur. For example, while a first user is working on database asset 43 (e.g., is modifying cached file 42) on his/her client computer 22, a second user could attempt to access database asset 43 from database 54. In one embodiment of the present invention, cache manager 38 can receive notifications from database management program 52 of when additional users access database asset 43. Cache manager 38 can then present, in a graphical user interface, various choices to the user as to how to resolve the contention over database asset 43. For example, the first user could be given, in a dialog box, the choice to retrieve the latest version of database asset 43 with any changes made by the second user. Alternatively, database management program 52 could implement automatic rules such as giving priority to the first user, etc.

In addition to receiving notifications from database management program 52 regarding database assets upon which a user is currently working, cache manager 38 can receive notifications regarding database assets upon which the user has previously worked (e.g., database assets for which there is a corresponding cached file 42 in cache 40). Thus, for example, if a user has previously worked on database asset 43 and a version of cached file 42 remains in cache 40, cache manager 38 can receive notifications regarding database asset 43. If database asset 43 were changed by another user, cache manager 38 can receive a notification from database management program 52 regarding the change and present the notification to the user (e.g., in a graphical user interface such as a dialog box). Thus, cache manager 38 can receive information regarding various database assets (e.g., database asset 43) upon which a user has worked. It should be noted that database management programs 52 that provide such notifications are well known in the art.

Cache manager 38 can also receive notifications from database management system 52 that a database asset for which there is a corresponding cached file 42 in cache 40 has been deleted from database 54. In one embodiment of the present invention, upon receipt of such notification, cache manager 38 can notify the user via a graphical user interface that the database asset has been removed and can purge the corresponding cached file 42 from cache 40.

By having the capability to seamlessly save changes to a cached file to a database and receive notifications from the database management program regarding the associated database asset, cache manager 38 can participate in bi-directional synchronization of the cache. That is, cache manager 38 can synchronize database asset 43 with cached file 42 whenever changes are made (or detected via polling) to cached file 42, and cache manager 38 can notify a user of changes made by others to database asset 43. Thus, database asset 43 can reflect the most recent changes made by a user to cached file 42 and users can be made aware of changes made by others to database asset 43.

Figure 2:
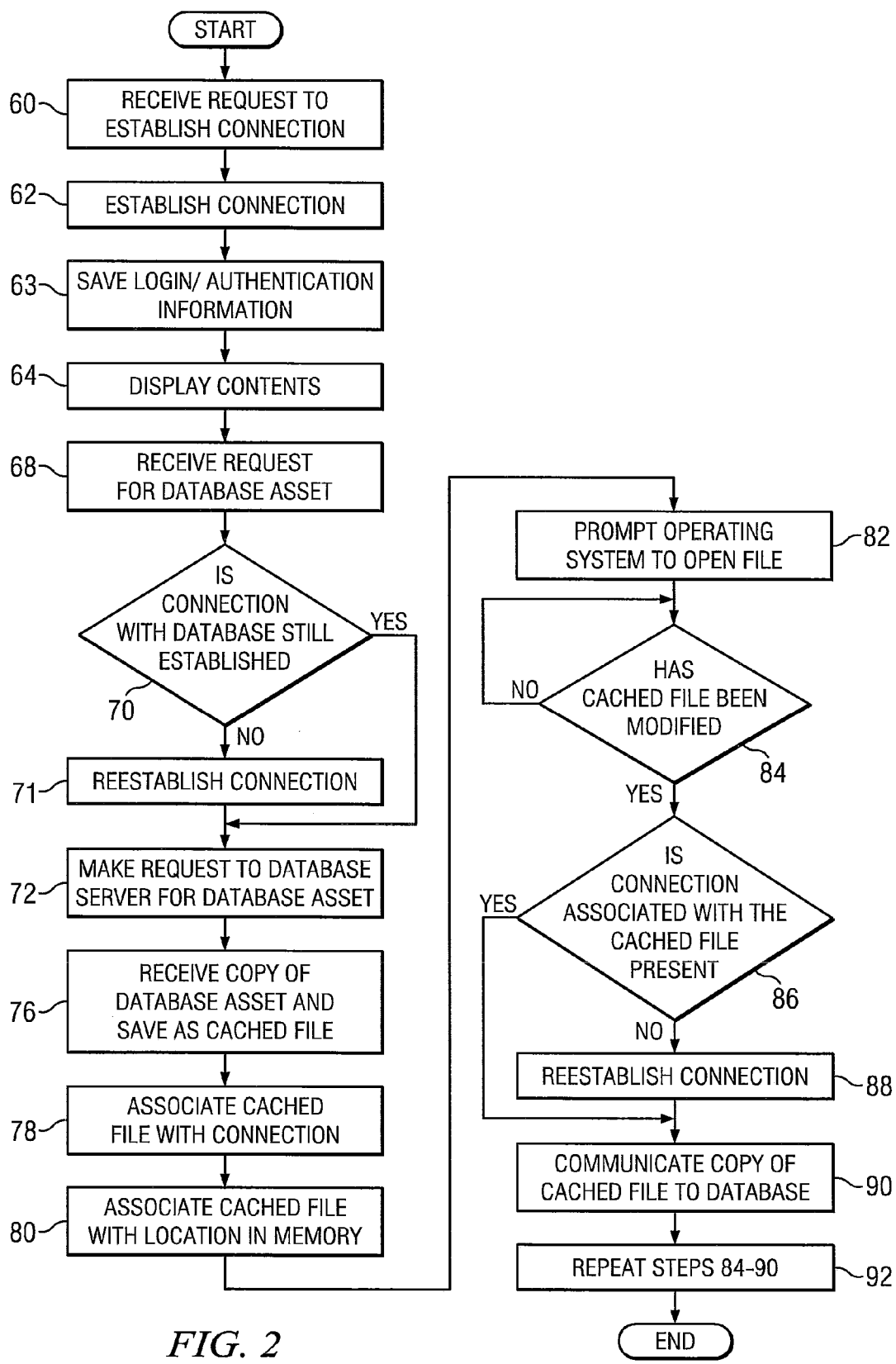
FIG. 2 is a flow chart diagramming the operation of one embodiment of the method and system for synchronization of a cache according to the present invention.

FIG. 2 is a flow chart diagramming the operation of one embodiment of the method and system for cache synchronization of this invention. At step 60, cache manager 38 can receive a request to establish a connection to database 54. The request can occur, for example, in response to an employee attempting to connect to a corporate database. Cache manager 38 can establish a connection to a server associated with database 54 (e.g., server 24), at step 62, via standard network communication device 44. As would be understood by those of ordinary skill in the art, access to a database often requires that a user enter a login and/or other authentication information. To prevent the user from having to re-enter this information if the connection to server 24 is dropped or lost, cache manager 38, at step 63, can save the login or authentication information. Cache manager 38, at step 64, can provide the contents of the database (e.g., database 54) to an external graphical user interface. In one embodiment of the present invention, the graphical user interface can be integrated into an interface provided by file management system 35 of operating system 34. Thus, in a Microsoft® Windows environment, database 54 could appear as an additional tree node in a directory display in the Windows Explorer file management system and each database asset associated with database 54 can appear as a file in the file tree display of the Windows® Explorer display. In an alternative embodiment of the present invention, cache manager 38, at step 64, can display the database contents in an independent graphical user interface. This can be done in systems where integration with operating system 34 and its associated file management system 35 cannot be easily achieved.

Based on the database assets displayed in the graphical user interface, the user can select the database asset with which he/she wishes to work (e.g., database asset 43). This can be done in a Windows-based environment, for example, by the user double clicking on the database asset displayed in the Windows Explorer display. At step 68, cache manager 38 can receive a request for the selected database asset. Cache manager 38 can then determine, at step 70, if the connection to the database with which the database asset is associated (e.g., database 54) is still present or whether it has been dropped or disconnected. If the connection has been dropped or disconnected, cache manager 38, at step 71, can re-establish the connection using either re-entered login and/or authentication information from the user or login and/or authentication information that was saved at step 63. After the connection is re-established, or if the connection was not dropped or disconnected as determined at step 70, cache manager 38, at step 72, can make a request to server 24 for the selected database asset.

At server 24, database management program 52 can receive the request for the selected database asset (e.g., database asset 43), search database 54 for the database asset, and, if the database asset is found, communicate the database asset to client computer 22. At step 76, cache manager 38 can receive a copy of the database asset and save the copy of the database asset as cached file 42 in cache 40 of memory 32. Additionally, at step 78, cache manager 38 can associate the cached file 42 with a particular connection. Because cached files are associated with a particular connection, cache manager 38 will be able to communicate changes associated with a database asset (e.g., changes to the corresponding cache file) back to the appropriate (e.g., the associated) database. Cache manager 38, at step 80, can also associate cached file 42 with a unique location in memory 32 (e.g., at cache 40 of client computer 22). Thus, for example, if database asset 43 was the file myfile.jpg, cache manager 38 can save database asset 43 as cached file 42 at the location "C:\cache\db54\myfile.jpg."

Cache manager 38, at step 82, can prompt operating system 34 to open cached file 42 (e.g., myfile.jpg). Operating system 34 can open cached file 42 with the application 36 with which operating system 34 (or the user) would normally open such a file. Thus, for example, if .jpg files were associated with PhotoShop, operating system 34 can open myfile.jpg with PhotoShop (e.g., application 36) from "C:\cache\db54\myfile.jpg." The user can then view and/or modify cached file 42 (e.g., myfile.jpg) in the appropriate application 36 (e.g., PhotoShop).

In order to synchronize database asset 43 with cached file 42, cache manager 38, at step 84, can determine if the cached file 42 has been modified. As described earlier, this can be done either through receiving notification from file management system 35 that cached file 42 has been saved or by polling cached file 42 to determine if the file has changed. As described in the Management Application, polling can be done, for example, by reading a time stamp associated with cached file 42 to determine the last time at which cached file 42 was modified. If the time stamp from the most recent polling of cached file 42 does not match the time stamp from a previous polling of cached file 42, then cached file 42 has been modified and cache manager 38 can attempt to synchronize cached file 42 with database 54. As can be understood by those of ordinary skill in the art, the frequency at which cache manager 38 polls cached file 42 can be adjusted to optimize the resources of client computer 22. A more frequent polling will require more resources but will result in a lower latency between the time when a cached file 42 is modified and when cache manager 38 determines cached file 42 has been modified. Conversely, a longer time interval between each polling of cached file 42 will reduce the required resources of client computer 22 but can lead to a longer latency period. Thus, the polling interval can be set to optimize system resources with respect to latency period.

Returning now to FIG. 2, if at step 84 cache manager 38 determines that cached file 42 has not been modified (e.g., changed, deleted, etc.), cache manager 38 can continue to either poll cached file 42 for modifications or wait for file management system 35 to indicate that cached file 42 has been modified. If, on the other hand, cache manager 38 determines at step 84 that cached file 42 has been modified (e.g., through polling or notification from file management system 35), cache manager 38 can determine, at step 86, if the connection associated with cached file 42 (e.g., the connection to database 54 over which cache manager 38 received database asset 43) is still established. If the connection has been dropped, cache manager 38 can re-establish the connection at step 88. If login or authentication information is required to re-establish the connection, cache manager 38 can use the login or authentication information saved from the user at step 63 or, alternatively, prompt the user to enter new login and/or authentication information. Once the connection has been re-established at step 88 (or, if at step 86 cache manager 38 determined that the connection associated with cached file 42 was still established), cache manager 38, at step 90, can save a copy of cached file 42 directly to database 54 (e.g., without the need for an intermediate synchronization program). Cached file 42 can then be saved as database asset 43, and thus, database 54 can be synchronized with the most recent changes made to cached file 42. At step 92, cache manager 38 can optionally repeat steps 84-90 for cached file 42 until the user ceases work on cached file 42 or, alternatively, cached file 42 expires (some pre-determined amount of time passes during which cached file 42 is not viewed or modified).

Because cached file 42 can be communicated to database 54 immediately or almost immediately after cached file 42 has been modified, database asset 43 can more accurately reflect the latest revisions to database asset 43. Thus, subsequent users accessing database asset 43 are ensured of having the latest revisions to database asset 43. Furthermore, because cache manager 38 can use inherent notification features of file management system 35 or can automatically poll cached file 42 for changes, the present invention does not require the user to save cached file 42 to database 54 using a separate synchronization program, thereby further reducing latency. Additionally, by omitting the extra step of saving cached file 42 in a synchronization program, the user can save time each time he/she modifies a cached file.

The teachings of the present invention provide an additional advantage by enabling the "seamless" use of tools of choice. Because cache manager 38 can prompt operating system 34 to open cached file 42 in the application 36 with which the file type of cached file 42 is normally associated, users can use their tools of choice to modify and view database assets without having to rely on custom designed and unfamiliar tools provided by database vendors or on being limited to using only those tools for which a synchronization program exists. Additionally, because cache manager 38 resides at the file system level rather than at the operating system level (e.g., resides in user space, rather than operating space), cache manager 38 is less likely to degrade the stability of client computer 22.

In addition to reducing latency, empowering tools of choice, and maintaining stability of client computer 22, cache manager 38 can help resolve contention between various users for the same database asset. As can be understood by those of ordinary skill in the art, embodiments of database management software program 52 can send notification of when a user attempts to access a database asset. For example, database management software program 52 could send a notification to cache manager 38 when an additional user attempts to access a database asset 43. Cache manager 38 can then send a notification to the first user, via a graphical user interface, that another user is attempting to access database asset 43. In one embodiment of the present invention, this can occur whether or not the first user is currently working on cached file 42. The first user can be given various options, such as to view the latest version of database asset 43 or, if the first user is currently modifying cached file 42, overriding changes made by any other user to database asset 43.

Because cache manager 38 can be notified when other users attempt to modify database asset 43, each user who has previously accessed and modified database asset 43 can be made aware of changes to that database asset. Thus, if several members of a team are working on a project involving database asset 43, each member can be made aware of when another member of the team (or some other user) modifies or accesses database asset 43, thereby aiding in control of the database asset. Furthermore, cache manager 38 can provide bi-directional synchronization of database asset 43 by not only saving changes made to cached file 42 to database 54, but also by notifying users of changes in database asset 43.

As can be understood from the foregoing discussion, embodiments of the present invention provide a system for seamlessly and transparently synchronizing database assets as users work on those assets. Embodiments of the present invention also provide the advantage of allowing users to employ tools of choice without having to perform the extra steps required for saving a database asset through a separate synchronization program. Additionally, the teachings of the present invention enable the use of tools of choice regardless of a database asset's file type. Further, embodiments of the present invention are less likely to degrade the stability of client computer 22.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for synchronizing a file in a cache comprising:
a cache manager at a client computer receiving a database asset from a database at a database server, wherein the client computer is executing an operating system, the cache manager, and a local application, wherein the client computer is coupled to the database server over a network;
the cache manager storing the database asset in a cache of the client computer as a cached file;
the cache manager prompting the operating system to open the cached file using a local application associated with a file type for the cached file;
receiving, at the cache manager, a notification from the operating system indicating that the cached file has been modified;
the cache manager determining that the cached file has been modified based on receiving the notification from the operating system; and
the cache manager communicating the modified cached file to the database.

2. The method of claim 1, further comprising:
prior to said receiving at the client computer the database asset, the cache manager requesting the database asset from the database.

3. The method of claim 2, further comprising:
the cache manager establishing the connection with the database, wherein the database server is executing a database management application managing the database;
the cache manager determining if the connection with the database has become disconnected; and if the connection with the database has become disconnected, the cache manager reestablishing the connection to the database.

4. The method of claim 1, further comprising:
the cache manager associating the cached file with a connection.

5. The method of claim 1, further comprising:
the cache manager associating the cached file with a location in a memory.

6. The method of claim 1, further comprising:
the cache manager notifying a first user that an additional user has accessed the database asset.

7. The method of claim 1, further comprising:
the cache manager purging the cached file from the cache if the database asset is deleted from the database.

8. A non-transitory computer readable storage medium including computer executable program instructions for:
connecting a client computer executing an operating system, a cache manager and a local application to a database server;
receiving, at the client computer, a database asset from a database at a database server;
storing the database asset in a cache as a cached file in a computer readable memory of the client computer using a cache manager;
causing the cache manager to prompt the operating system to open the cached file using a local application associated with a file type for the cached file;
causing the cache manager to determine if the cached file has been modified based on a notification from a file management system of the operating system; and
if the cached file has been modified, communicating the cached file to the database.

9. The non-transitory computer readable storage medium of claim 8, further comprising computer program instructions for:
prior to said receiving at the client computer the database asset, requesting the database asset from the database.

10. The non-transitory computer program product of claim 8, further comprising computer executable program instructions for:
associating the cached file with a connection.

11. The non-transitory computer program product of claim 10, further comprising computer executable program instructions for:
establishing the connection with the database, wherein the database is managed by a database management program;
determining if the connection with the database has become disconnected; and
if the connection with the database has become disconnected, reestablishing the connection to the database.

12. The non-transitory computer program product of claim 10, further comprising computer executable program instructions for:
associating the cached file with a location in a memory.

13. The non-transitory computer program product of claim 10, further comprising computer executable program instructions for:
notifying a first user that an additional user has accessed the database asset.

14. The non-transitory computer program product of claim 10, further comprising computer executable program instructions for:
purging the cached file from the cache if the database asset is deleted from the database.

15. A system comprising:
a database server computer coupled to a network, wherein the database server computer includes a database, wherein the database server computer is executing a database management application managing the database; and
a client computer coupled to the database server computer via the network, wherein the client computer comprises a cache, wherein the client computer is executing an operating system, a cache manager, and a local application, wherein the cache manager manages the cache, wherein the cache manager is operable to:
receive a database asset from a database at a database server;
store the database asset in a cache of the client computer as a cached file;
prompt the operating system to open the cached file using a local application associated with a file type for the cached file;
receive a notification from the operating system indicating that the cached file has been modified;
determine that the cached file has been modified based on receiving the notification from the operating system; and
communicate the modified cached file to the database.

16. The system of claim 15, wherein the cache manager is further operable to:
prior to receiving the database asset, request the database asset from the database.

17. The system of claim 15, wherein the cache manager is further operable to:
associate the cached file with a connection.

18. The system of claim 17, wherein the cache manager is further operable to:
establish the connection with the database;
determine if the connection with the database has become disconnected; and
if the connection with the database has become disconnected, reestablish the connection to the database.

19. The system of claim 15, wherein the cache manager is further operable to:
associate the cached file with a location in a memory.

20. The system of claim 15, wherein the cache manager is further operable to:
notify a first user that an additional user has accessed the database asset.

* * * * *